US012731068B2

(12) United States Patent
Bigaj et al.

(10) Patent No.: US 12,731,068 B2
(45) Date of Patent: Sep. 8, 2026

(54) SELECTING REPRESENTATIVE FEATURES FOR MACHINE LEARNING MODELS

(71) Applicant: International Business Machines Corporation, Armonk, NY (US)

(72) Inventors: Rafal Bigaj, Cracow (PL); Lukasz G. Cmielowski, Cracow (PL); Wojciech Sobala, Cracow (PL); Maksymilian Erazmus, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 977 days.

(21) Appl. No.: 17/212,519

(22) Filed: Mar. 25, 2021

(65) Prior Publication Data

US 2022/0309384 A1 Sep. 29, 2022

(51) Int. Cl.
*G06N 20/00* (2019.01)
*G06N 5/04* (2023.01)

(52) U.S. Cl.
CPC ............... *G06N 20/00* (2019.01); *G06N 5/04* (2013.01)

(58) Field of Classification Search
CPC ...... G06N 20/00; G06N 5/04; G06F 18/2113; G06F 18/10
See application file for complete search history.

(56) References Cited

U.S. PATENT DOCUMENTS 9,912,523 B2 * 3/2018 Shivashankar ..... H04L 41/0631
10,339,411 B1 * 7/2019 Hua ........................ G06T 17/20
10,482,112 B2 11/2019 Chen et al.
2005/0154710 A1 * 7/2005 Ruhlow ............ G06F 16/24561
2017/0270427 A1 * 9/2017 Zhou ...................... G06N 20/00
2017/0316050 A1 11/2017 Hill et al.
2019/0138946 A1 5/2019 Asher et al.
2020/0175314 A1 6/2020 Fang et al.
2022/0303188 A1 * 9/2022 Wilson .................... G06F 18/23

FOREIGN PATENT DOCUMENTS

WO WO2004029826 A1 * 9/2002 ........... G06F 16/313

OTHER PUBLICATIONS

Jundong Li, et al. "Feature Selection." ACM Computing Surveys, vol. 50, No. 6 (Year: 2018).*
Jensen, Richard, et al. Feature Grouping-Based Fuzzy-Rough Feature Selection. (Year: 2014).*
Haichuan Yang, et al. Online Feature Selection. (Year: 2016).*
Khalid et al., "A survey of feature selection and feature extraction techniques in machine learning." (Year: 2014).*
Guyon, et al., "An introduction to variable and feature selection." (Year: 2003).*
Rangarajan, Lalitha. "Bi-level dimensionality reduction methods using feature selection and feature extraction." (Year: 2010).*
Hu, Xiaosong, et al. "Battery health prediction using fusion-based feature selection and machine learning." (Year: 2003).*
Li, et al., "Feature Selection" (Year: 2017).*

* cited by examiner

*Primary Examiner* — Michelle T Bechtold
*Assistant Examiner* — Matiyas T Maru
(74) *Attorney, Agent, or Firm* — Yee & Associates, P.C.

(57) ABSTRACT

A set of input features, each feature having a value, can be processed to determine pairwise correlations between features of the set. The features can be arranged into groups based on correlations with one another. Each feature can also be analyzed to determine a predictive value. A representative feature of each group can be selected based on the predictive value.

20 Claims, 10 Drawing Sheets

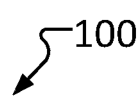
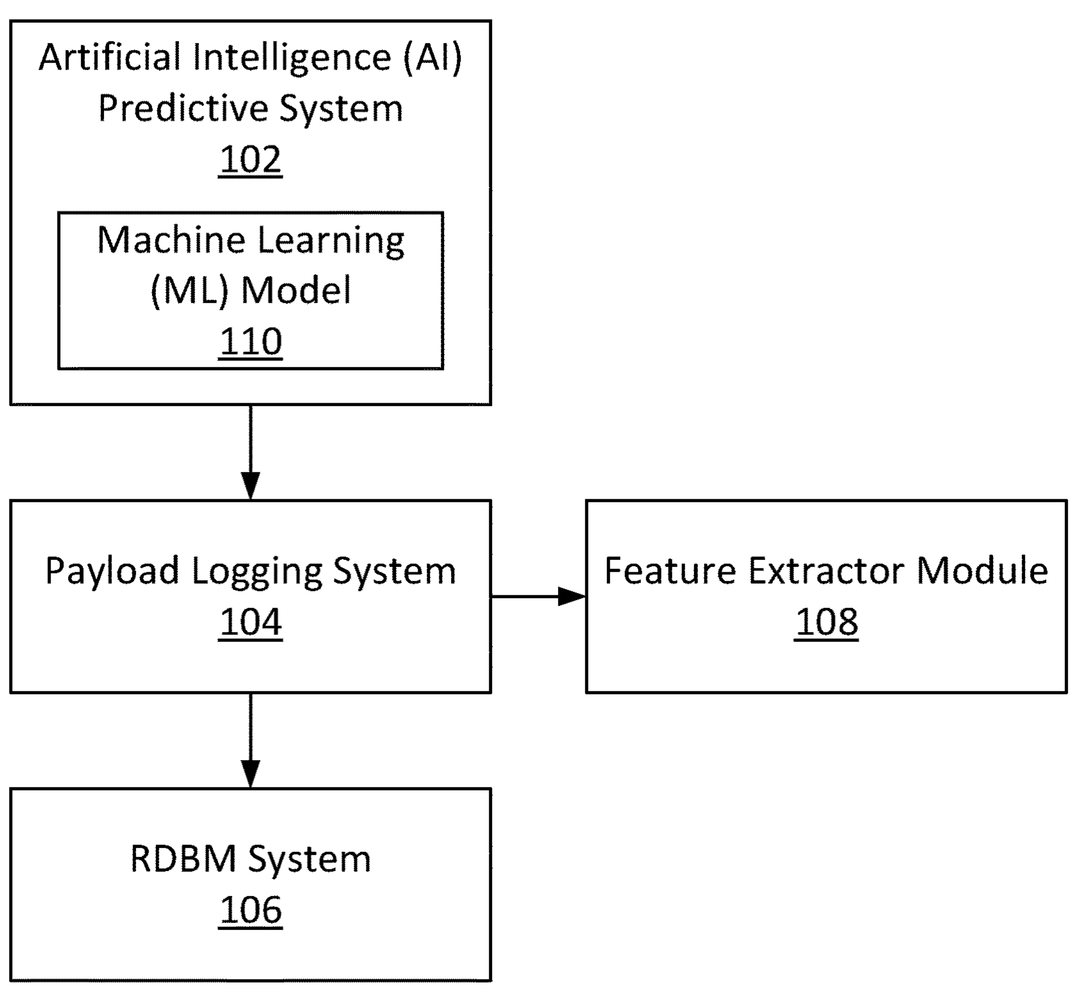
FIG. 1

202

|  | $F_1$ | $F_2$ | $F_3$ | ... | $F_N$ |
|---|---|---|---|---|---|
| $IN_1$ | $F_1$'s Value | $F_2$'s Value | $F_3$'s Value | ... | $F_N$'s Value |
| $IN_2$ | $F_1$'s Value | $F_2$'s Value | $F_3$'s Value | ... | $F_N$'s Value |
| ... | ... | ... | ... | ... | ... |
| $IN_K$ | $F_1$'s Value | $F_2$'s Value | $F_3$'s Value | ... | $F_N$'s Value |

204

| Prediction |
|---|
| ML Output 1 |
| ML Output 2 |
| ... |
| ML Output K |

FIG. 2

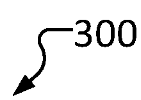

Determine pairwise correlations of a set of features using their values in a set of inputs
302

Determine one or more groups of correlated features of the set of features based on the determined correlations
304

Determine correlations between the values of each feature of the groups of features and the set of prediction values of the machine learning model
306

Select, based on the correlations with the predictions, at least one representative feature from each group
308

FIG. 3

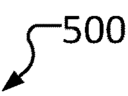
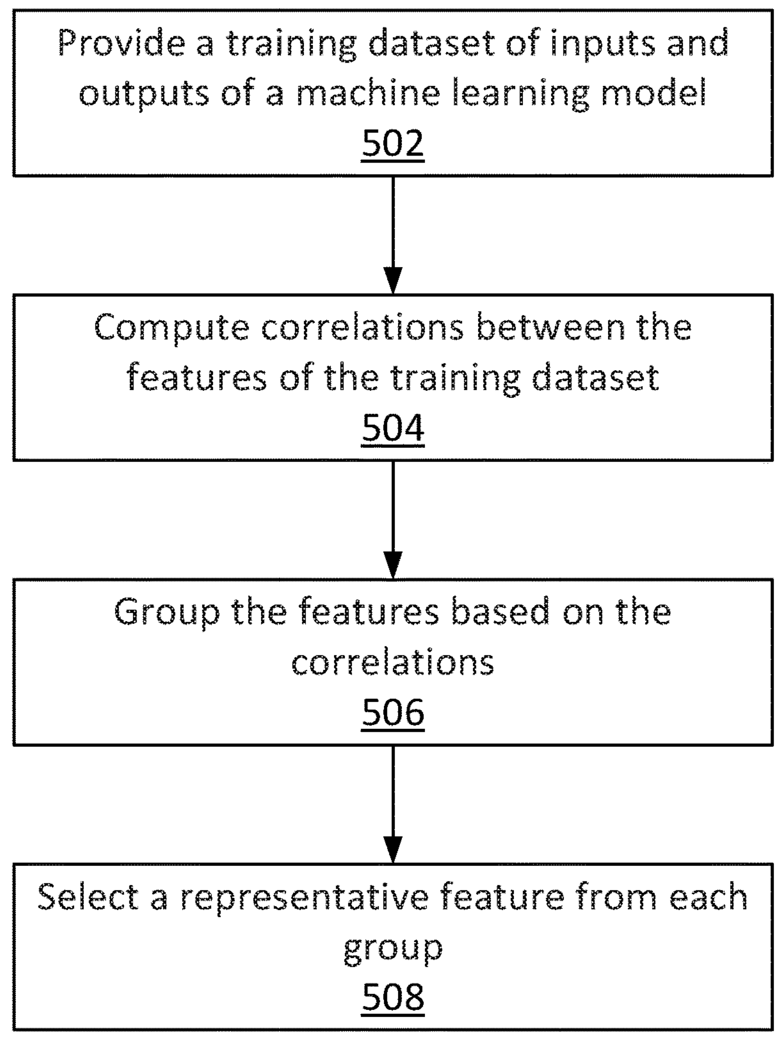
FIG. 5

610

| | CheckingStatus | LoanDuration | CreditHistory | LoanPurpose | LoanAmount | ExistingSavings | EmploymentDuration | Risk |
|---|---|---|---|---|---|---|---|---|
| 0 | 0_to_200 | 31 | credits_paid_to_date | other | 1889 | 100_to_500 | less_1 | No Risk |
| 1 | less_0 | 18 | credits_paid_to_date | car_new | 462 | less_100 | 1_to_4 | No Risk |
| 2 | less_0 | 15 | prior_payments_delayed | furniture | 250 | less_100 | 1_to_4 | No Risk |

FIG. 6

| | CheckingStatus | LoanDuration | CreditHistory | LoanPurpose | LoanAmount | ExistingSavings | EmploymentDuration |
|---|---|---|---|---|---|---|---|
| CheckingStatus | 1.000000 | 0.321585 | 0.265472 | 0.018196 | 0.377742 | -0.090607 | -0.016209 |
| LoanDuration | 0.321858 | 1.000000 | 0.467046 | 0.144518 | 0.672917 | -0.180166 | -0.177044 |
| CreditHistory | 0.265472 | 0.467046 | 1.000000 | 0.089098 | 0.470215 | -0.227916 | -0.194540 |
| LoanPurpose | 0.018196 | 0.144518 | 0.089098 | 1.000000 | 0.133994 | -0.007713 | -0.042840 |
| LoanAmount | 0.377742 | 0.672917 | 0.470215 | 0.133994 | 1.000000 | -0.177912 | -0.162597 |
| ExistingSavings | -0.090607 | -0.180166 | -0.227916 | -0.007713 | -0.177912 | 1.000000 | 0.161157 |
| EmploymentDuration | -0.016209 | -0.177044 | -0.194540 | -0.042840 | -0.162597 | 0.161157 | 1.000000 |
| InstallmentPercent | 0.361930 | 0.688044 | 0.490860 | 0.154077 | 0.725041 | -0.179471 | -0.214958 |
| OthersOnLoan | -0.200904 | -0.344418 | -0.176209 | -0.101317 | -0.340100 | -0.024623 | -0.024581 |
| CurrentResidenceDuration | 0.362824 | 0.558200 | 0.438669 | 0.083108 | 0.618314 | -0.169667 | -0.160938 |
| OwnsProperty | 0.050085 | 0.119194 | 0.065466 | 0.015904 | 0.133162 | -0.001823 | 0.015422 |
| InstallmentPlans | 0.021158 | -0.016799 | -0.026298 | -0.007585 | -0.062478 | 0.015588 | 0.001930 |
| Housing | -0.243916 | -0.487731 | -0.348496 | -0.102272 | -0.547129 | 0.133413 | 0.153845 |
| ExistingCreditCount | 0.244459 | 0.490006 | 0.347542 | 0.075659 | 0.561821 | -0.069968 | -0.09668 2 |

830

832

```
groups = [ ]
columns = encoded_df.columns for i, col in enumerate (columns) :
  if not next ( (True for x in groups if col in x), False) :
    group = [c for ci, c in enumerate (columns) if ci >= i and np.abs (features_corr.iloc [i,ci]) > .5]
    if len (group) > 1:
      groups.append(group)
groups
```

| | LoanDuration | LoanAmount | InstallmentPercent | CurrentResidenceDuration |
|---|---|---|---|---|
| prediction | 0.532052 | 0.608774 | 0.599835 | 0.532272 |

FIG. 9

SELECTING REPRESENTATIVE FEATURES FOR MACHINE LEARNING MODELS

BACKGROUND

The present invention relates to the field of digital computer systems, and more specifically, to a method for selecting a representative input feature for a machine learning model.

Machine learning models are being integrated in many software systems such as database transaction processing systems. These models may be very complex to evaluate. For that, the evaluation and monitoring of such models rely on the behavior of the outcomes as function of the inputs. However, such evaluations may be resource consuming.

SUMMARY

Various embodiments provide a method, computer system and computer program product as described by the subject matter of the independent claims. Advantageous embodiments are described in the dependent claims. Embodiments of the present invention can be freely combined with each other if they are not mutually exclusive.

Some embodiments of the present disclosure can be illustrated as a method. The method comprises generating, using a trained machine learning model, a set of prediction values from a set of inputs, wherein each input of the set of inputs includes values of a set of features. The method further comprises determining pairwise correlations of the set of features using their values in the set of inputs. The method further comprises determining one or more groups of correlated features of the set of features based on the determined correlations. The method further comprises determining correlations between the values of each feature of the groups of features and the set of prediction values of the machine learning model. The method further comprises selecting from each group of the groups at least one representative feature based on the correlations with the predictions.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

FIG. 1 is a diagram of an example system for identifying correlated feature groups, consistent with several embodiments of the present disclosure.

FIG. 2 depicts a representation of a set inputs and outputs of the machine leaning model in accordance with an example of the present subject matter.

FIG. 3 is a flowchart of a method in accordance with an example of the present subject matter.

FIG. 5 is a flowchart of a method for selecting representative features of inputs of a trained machine learning model in accordance with an example of the present subject matter.

FIG. 6 depicts a table comprising inputs and outputs of a trained machine learning model.

FIG. 8 is a code snippet for grouping correlated features in accordance with an example of the present subject matter.

FIG. 9 depicts a correlation table comprising correlation coefficients between the grouped features and the predictions of the machine learning model.

Figure 4:
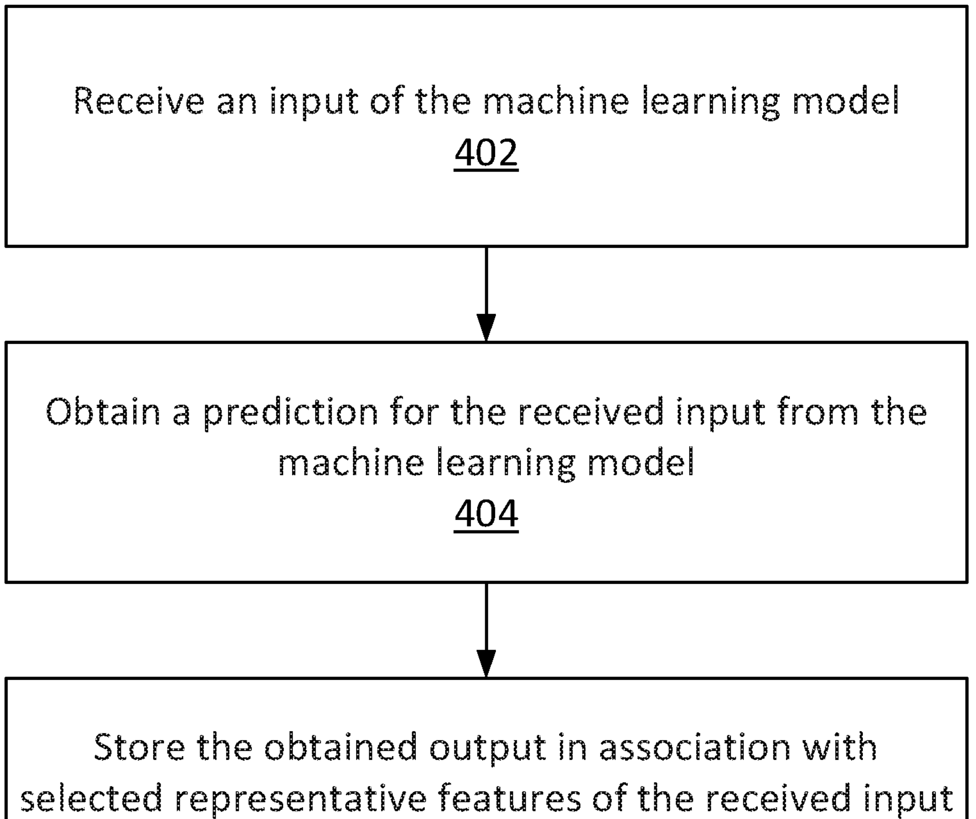
FIG. 4 is a flowchart of a method for logging data of a trained machine learning model in accordance with an example of the present subject matter.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The descriptions of the various embodiments of the present invention are presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term "machine learning" refers to use of a computer algorithm to extract useful information from training data by building probabilistic models (referred to as machine learning models) in an automated way. The machine learning may be performed using one or more learning algorithms such as linear regression, K-means, classification algorithm, reinforcement algorithm, gradient descent for a deep neural network etc. A "model" may for example be an equation or set of rules that makes it possible to predict an unmeasured value from other known values and/or to predict or select an action.

In order to trust and reliably act on machine learning model predictions, it may be beneficial to monitor and evaluate the distribution of incoming requests and corresponding outputs of the machine learning models. For example, the sensitivity of a machine learning model may be evaluated, wherein the sensitivity describes the severity (e.g., magnitude) of a change of the model's output related to the change of a given input value. This may provide an insight in the influence of input variables on outputs. This type of analysis may be used for understanding models' behavior in terms of the change of input values, noise tolerance, data quality, internal structure, etc. In addition, it is common practice to log the inputs and outputs of machine learning models for these monitoring and evaluation purposes. Such logged data may be structured as scoring payload data which is usually persisted (i.e., retained) in relational database management (RDBM) systems in the form of structured query language (SQL) tables.

The evaluation process of a machine learning model may thus involve logging of data and then evaluation of the logged data. However, this process may be very resource-intensive in terms of computational resources (e.g., processing power, memory, etc.), particularly for big models with large input sizes. For example, a number of input features may exceed a supported number of columns in the SQL table. Systems and methods consistent with the present disclosure address this issue by balancing the storage size against a reliable evaluation analysis of the machine learning model. An example system first performs correlation analysis on scoring input data. The strongly correlated features are organized via this analysis into groups. Furthermore, for each correlated feature group, a single feature may be selected to represent the group, such that only the selected feature may be logged.

In some embodiments, the feature groups are disjoint groups (i.e., the groups may have no features in common). For example, given a set of 5 features F_1, F_2, F_3, F_4, F_5, a first group may include features F_1 and F_3, while a second group may include features F_2, F_4, and F_5. In this example, the first and second groups are disjoint groups. If the first group also included F_2 (while the second group remained unchanged), the groups are no longer disjoint, as they share a feature (F_2). Use of disjoint groups may be advantageous as the correlations may form distinct local correlations in an input feature space. Separating the groups of correlated features may prevent missing some important additional representative features because the highest correlated features may not appear in all groups. While additional representative features may not be associated with the highest correlation values, such additional representative features may still have a reliable representation power.

In some embodiments, determining the groups comprises: arranging the set features in accordance with a predefined order; iteratively processing the set of features following the order comprising, for the features: determining whether the respective feature is part of a group; in response to determining that the respective feature is not part of a group, searching zero or more features having an order higher than the order of the respective feature and having a correlation with the respective feature that is higher than a predefined threshold; and forming a group from the zero or more features. The determining of the groups is performed such that the determined groups may, for example, be disjoint groups.

For example, a set of features may comprise N features F_1, F_2 . . . F_N. The features may be processed to identify correlated features. For example, the feature F_1 may be processed in order to identify all features F_j, where j=2, . . . or N that have a correlation corr(F_1,F_j) with the feature F_1 which is higher than a predefined threshold (for example, corr(F_1,F_j)>0.5). This may result in a group GRP1 of features that are correlated with the feature F_1. For example, GRP1 may include F_2 and F_6. In a next iteration, the next ordered feature that is not part of the group GRP1 may be processed as described with reference to feature F_1. For example, as group GRP1 includes feature F_2 but not F_3, the next iteration may process feature F_3 in order to generate corresponding group GRP3 from the features that are ordered higher than F_3 (and absent from GRP1). For example, group GRP3 may include any features from the features F_4, F_5, F_7, . . . or F_N that are correlated with F_3 with a correlation above the threshold. In the next iteration, the feature following the feature F_3 and which is not present in GRP1 and GRP3 may be processed as described with F_1 and F_3, and so on.

According to one embodiment, the predefined order may be in accordance with the correlation values. Feature sorting to order them by highest correlation coefficient may guarantee that the algorithm of the previous embodiment start with the mostly correlated features.

According to one embodiment, the method further comprises selecting the most correlated feature as the representative feature of the group. In another example, the most m correlated features of each group may be provided as representative features of the group, wherein m>0, e.g. m=1,2 or 3. The number m may, for example, be chosen based on the available storage space for storing the inputs and the outputs of the machine learning model e.g. the more space available the higher the value of m may be. This may be advantageous as it may provide a configurable parameter that can be configured e.g. dynamically, based on current storage situation.

According to one embodiment, the method further comprises receiving a new input. The method further comprises for the new input: processing the new input by the machine learning model, and storing the selected representative features of the new input in association with the prediction. This may save storage resources as it may save only relevant parts of the processed data.

According to one embodiment, the storing is performed in a database having a maximum storage size, wherein the selecting and the storing of the representative features is performed if the number of the set of features exceeds the maximum size. The storage size may, for example, be the number of columns of the database. Each column of the database may be configured to comprise values of a respective input feature of the trained machine learning model. Thus, if the number of columns of the database is large enough to store all the input features of the trained machine learning model, the selection and storage of the representative features may not be used. For example, if the number of the set of features does not exceed the maximum storage size, all the set of features may be stored because the database has enough space to comprise all the features. However, if the number of the set of features is larger than the number of columns of the database (i.e., the database does not have enough space to store all features), the present method may advantageously be used to store only representative features of the set of features. The maximum storage size may be a defined by a user of the computer system, or may be the maximum size of data that can be stored in the database.

According to one embodiment, the method further comprises using the stored features and associated predictions for updating the machine learning model.

According to one embodiment, the method is performed in real-time.

According to one embodiment, software or a program implementing at least part of the method described herein is provided as a service in a cloud environment.

FIG. 1 is a diagram of an example system 100 for identifying correlated feature groups, consistent with several embodiments of the present disclosure. System 100 comprises an artificial intelligence (AI) predictive system 102, a payload logging system 104, a relational database management (RDBM) system 106, and a feature extractor module 108. AI predictive system 102 comprises at least one trained machine learning (ML) model 110. Trained ML model 110 may be configured to receive an input having a set of features and to provide an output or a prediction.

The specific functions of components of system 100 are described in further detail with reference to table 202 of FIG. 2. As shown in FIG. 2, each input of K inputs [IN]_1, [IN]_2 . . . [IN]_K of the trained machine learning model 109 may comprise values of a set of N features F_1, F_2 . . . F_N. The inputs [IN]_1, [IN]_2 . . . [IN]_K may, for example, be organized in a table 202 as shown in FIG. 2, wherein each row of the table 202 represents one input of the trained machine learning model 110 and each column represents the values of a respective feature of the set of features F_1, F_2 . . . F_N. For example, for each input of the inputs [IN]_1, [IN]_2 . . . [IN]_K, trained ML model 110 may be inferred in order to provide a prediction or output [OUT]_1, [OUT]_2 . . . [OUT]_K. This may result, as shown in FIG. 2, in a vector 204 of outputs [OUT]_1, [OUT]_2 . . . [OUT]_K of the trained machine learning model 110 which are associated with the inputs [IN]_1, [IN]_2 . . . [IN]_K respectively. Thus, AI predictive system 102 may be configured to generate, using trained ML model 110, a set of prediction values [OUT]_1, [OUT]_2 . . . [OUT]_K from a set of inputs [IN]_1, [IN]_2 . . . [IN]_K, wherein each input of the set of inputs includes values of the set of features F_1, F_2 . . . F_N. The resulting table 202 and vector 204 may, for example, be used as training data in order to identify or select representative features.

Payload logging system 104 may be configured to log each input and an associated output produced by trained ML model 110 in RDBM system 106. Following the example of FIG. 2, payload logging system 104 may store table 202 and vector 204 in the RDBM system 106. This may result in a storage of N+1 columns in RDBM system 106. However, RDBM system 106, as with other databases, may have a limited storage capacity; RDBM system 106 may only store a maximum number of columns which may be smaller than the number of columns N+1. Feature extractor module 108 may be used in accordance with the present subject matter to address this issue, as described in further detail below with reference to FIG. 3.

In one example, the computer system 100 may be provided in a cloud environment e.g., the computer system 100 may be enabled by a cloud infrastructure of cloud-based servers, storage, and network resources accessible through a cloud virtualization technology.

FIG. 3 is a flowchart of a method 300 in accordance with an example of the present subject matter. For the purpose of explanation, method 300 described in FIG. 3 may be implemented in the system illustrated in FIGS. 1 and 2, but is not limited to this implementation. Method 300 may, for example, be implemented by the feature extractor module 108.

Method 300 comprises determining pairwise correlations of a set of features F_1, F_2 . . . F_N at operation 302. Operation 302 may include using values of the features included in a set of inputs [IN]_1, [IN]_2 . . . [IN]_K. For example, a pairwise correlation may be performed between the columns of the table 202. In some instances, operation 302 may, for example, be performed using the python function corr( ) as follows: features_corr=encoded_df.corr ( ), where encoded_df refers to a table such as table 202.

Method 300 further comprises grouping correlated features of the set of features at operation 304. Operation 304 may, for example, be performed based on correlations determined at step 302. Each group of the determined groups may comprise a subset of the set of features F_1, F_2 . . . F_N. For example, a first group may comprise features F_2 and F_6, while a second group may comprise features F_7 and F_8.

In some instances, the columns or features may be grouped based on a threshold comparison. For example, each correlation value obtained in step 302 may be compared with a threshold (such as, for example, 0.5), and if it exceeds the threshold, the two features associated with the correlation value may be included in the group. As a clarifying example, when identifying members of a first group, feature F_1 and feature F_2 may have a correlation value of 0.3. Given a threshold of 0.5, the correlation value of 0.3 is insufficient for inclusion. However, features F_1 and F_3 may have a correlation value of 0.6, which exceeds the threshold of 0.5, and thus features F_1 and F_3 may be added to the first group. This grouping example may be advantageous as it may provide a simple implementation while still providing reliable results.

In some instances, the set features may be arranged in accordance with a predefined order e.g. ascending order from 1 to N. Then, the set of features may be iteratively processed following the order as follows. For a currently processed feature F_i, where i=1, . . . or N, it may first be determined whether a group is already formed and whether the feature F_i is part of a previously formed group. If it is determined that the feature F_i is not part of any previously formed group, the features having an order j higher than i may be processed (e.g. if i=3, these features F_4, F_5 . . . F_N may be processed) in order to identify features having a correlation with the feature F_i that is higher than a predefined threshold. If one or more correlating features have been identified, they may be grouped in a group [GRP]_i.

As an example, operation 304 may result in two groups, [GRP]_1 formed starting from the feature F_1 and[GRP]_5 formed starting from the feature F_5. [GRP]_1 may comprise correlated features F_1, F_3, F_6 and F_10 and [GRP]_5 may comprise correlated features F_5, F_8 and F_12.

Method 300 further comprises determining, at operation 306, correlations between values of each feature of the groups of features and the set of prediction values of the machine learning model. Following the above example, operation 306 may include computing a correlation between the K values of each feature of the features F_1, F_3, F_6, F_10, F_5, F_8 and F_12 and the K output values of vector 204. This may result in seven correlation values associated with the features F_1, F_3, F_6, F_10, F_5, F_8 and F_12.

Method 300 further comprises selecting, based on the correlations with the predictions, at least one representative feature from each group at operation 308. Continuing with the above example, operation 308 may include comparing the four correlation values of the features F_1, F_3, F_6 and F_10 of the group [GRP]_1 against each other in order to select one or more features of the group [GRP]_1 based on the comparison result. For example, the feature of the group [GRP]_1 associated with the highest correlation value may be selected as the representative feature of the group [GRP]_1. Similarly, the three correlation values of the features F_5, F_8 and F_12 of the group [GRP]_5 may be compared against each other in order to select one or more features of the group [GRP]_5 based on the comparison result. For example, the feature of the group [GRP]_5 associated with the highest correlation value may be selected as the representative feature of the group [GRP]_5.

The method of FIG. 3 may thus result in one or more selected features of the set of features F_1, F_2 . . . F_N. Those selected features may advantageously be used to represent the set of inputs [IN]_1, [IN]_2 . . . [IN]_K, e.g., as described with reference to FIG. 4.

FIG. 4 is a flowchart of a method 400 for logging data of a trained machine learning model consistent with several embodiments of the present disclosure. Method 400 may be implemented in the system illustrated in FIGS. 1 and 2, but is not limited to this implementation. Method 400 may, for example, be implemented by the payload logging system 104.

Method 400 comprises receiving an input of a machine learning model at operation 402. The machine learning model may be, for example, machine learning model 110 as described above with reference to FIG. 1). The input may be part of an inference request for inferring the machine learning model 110. The received input may be a feature vector comprising N values of the set of features F_1, F_2 . . . F_N.

Method 400 further comprises obtaining a prediction for the received input from the machine learning model at operation 404. Operation 404 may include, for example, inputting the input received at operation 402 to machine learning model 110 and receiving an output prediction from machine learning model 110.

Method 400 further comprises storing the obtained output in association with features representative of the received input at operation 406. Operation 406 may include, for example, storing the obtained output in a database such as the RDBM system 106. Those features representative of the received input may be the selected features which are defined by method 300 as described above with reference to FIG. 3. Thus, instead of storing the whole received input in association with the obtained output, only the selected representative feature(s) may be stored in association with the obtained output. This may save storage resources while still providing data that can reliably be used (for example, to update the machine learning model).

In some instances, operation 406 may automatically be performed in response to producing the output by the machine learning model 110. In some instances, operation 406 may be performed in response to determining that the number N of the set of features exceeds the maximum size allowed by the RDBM system 106. In case the number N of the set of features does not exceed the maximum size, the whole input and the obtained output may be stored according to the second example.

FIG. 5 is a method 500 for selecting representative features of inputs of a machine learning model, consistent with several embodiments of the present disclosure. Method 500 may be implemented, for example, by system 100 illustrated in FIG. 1 (such as by feature extractor module 108).

Method 500 comprises providing a training dataset at operation 502. An example training dataset 610 is shown in FIG. 6. For simplification of the drawings and the description, only a small number of rows and columns of the training dataset 610 is shown. However, example training dataset 610 could comprise, for example, 5000 rows and 21 columns representing credit related data. The columns may represent input features of the machine learning model and the output of the machine learning model. That is, following the general example of FIG. 2, the number of features is N=20 and the number of inputs is K=5000. The features represented by the columns of the table 610 may, for example, be a loan amount, employment duration etc. The last column of the table 610 represents a risk, which is the prediction or output of the machine learning model for a received input of 20 feature values. The value of the output risk may, for example, be a probability of a risk event occurring. The training dataset 610 may, for example, be declared or named in a program as data_df. The values of the risk may be predicted by using, for example, the following line of python code: predictions=risk_model.predict(data_df.drop('Risk', axis=1)), where risk_model is the trained machine learning model.

Figure 7:
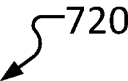
FIG. 7 depicts a correlation table comprising correlation coefficients between the input features of the machine learning model.

Method 500 further comprises computing correlations between the features of the training dataset at operation 504. Operation 504 may, for example, be performed as follows: features_corr=encoded_df.corr( ), where encoded_ df= data_df.drop('Risk', axis=1).apply(LabelEncoder( ).fit_transform). Operation 504 may result in the correlation table 720 shown in FIG. 7. Correlation table 720 shows pairwise correlation between the 20 features. For example, the correlation value between the feature CheckingStatus and the feature LoanDuration may be obtained by correlating the 5000 values of the column CheckingStatus in table 610 and the 5000 values of the column LoanDuration in table 610 in order to obtain the correlation value or coefficient 0.321858.

Method 500 further comprises grouping features based on the correlations at operation 506. Operation 506 may be performed using a correlation table such as, for example, correlation table 720 depicted in FIG. 7. One example algorithm that may be used to group the correlated features is represented by code snippet 830 in FIG. 8. The algorithm represented by code snippet 830 of FIG. 8 may, for example, search for each column X of table 610, a group of columns correlated with column X and having a correlation value higher than 0.5, wherein each column X is chosen such that it is not part of an existing group. In particular, line of code 832, reading "if not next((True for x in groups if col in x), False):" may ensure that features that were already grouped with others are not taken into consideration. Operation 506 may, for example, result in the following one group of correlated features LoanDuration, LoanAmount, InstallmentPercent, and CurrentResidenceDuration.

Method 500 further comprises selecting a group representative at operation 508 for each group that was identified at step 506. Operation 508 may, for example, be performed by correlating the columns associated with the features LoanDuration, LoanAmount, InstallmentPercent, and CurrentResidenceDuration in table 610 with the vector of predictions. These correlations may be organized in a result table. An example result table 940 is depicted in FIG. 9. Operation 508 may further include selecting a feature most correlated with the predictions to represent the group identified in operation 506. Continuing with the previous example, the feature LoanAmount may be selected as the most correlated feature. Operation 508 may, for example, be performed using the following lines of codes. The vector of predictions may be encoded as follows: encoded_predictions=pd.DataFrame({'prediction': predictions}).apply(LabelEncoder( ).fit_transform). Then, the encoded vector of predictions may be concatenated to the first 20 columns of the table 610 as follows: encoded_df_with_predictions=pd.concat([encoded_df, encoded_predictions], axis=1). The resulting concatenated table may be used to compute the correlations as follows: output_corr=encoded_df_with_predictions.corr( ). The correlations between the identified group of features and the predictions may be obtained as follows: output_corr[groups[0]][−1:], where "groups" is defined in code 830 of FIG. 8. This last line of code may result in table 940. A representative with the highest correlation coefficient may be selected from table 940 as follows: output_corr[groups[0]][−1:].idxmax(1)[0].

Figure 10:
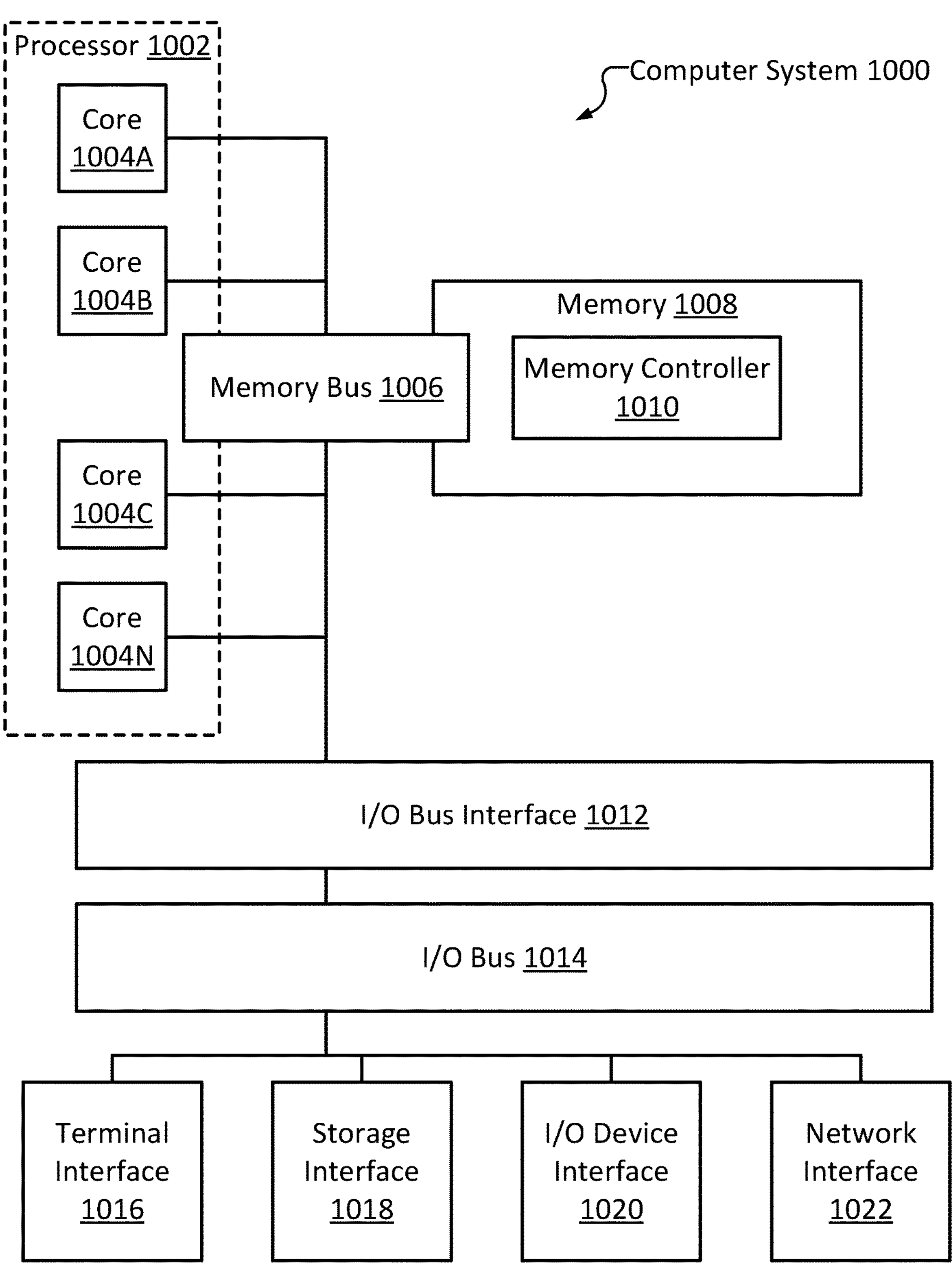
FIG. 10 illustrates a high-level block diagram of an example computer system that may be used in implementing embodiments of the present disclosure.

Referring now to FIG. 10, shown is a high-level block diagram of an example computer system 1000 that may be configured to perform various aspects of the present disclosure, including, for example, methods 300, 400, and 500. The example computer system 1000 may be used in implementing one or more of the methods or modules, and any related functions or operations, described herein (e.g., using one or more processor circuits or computer processors of the computer), in accordance with embodiments of the present disclosure. In some embodiments, the major components of the computer system 1000 may comprise one or more CPUs 1002, a memory subsystem 1008, a terminal interface 1016, a storage interface 1018, an I/O (Input/Output) device interface 1020, and a network interface 1022, all of which may be communicatively coupled, directly or indirectly, for inter-component communication via a memory bus 1006, an I/O bus 1014, and an I/O bus interface unit 1012.

The computer system 1000 may contain one or more general-purpose programmable processors 1002 (such as central processing units (CPUs)), some or all of which may include one or more cores 1004A, 1004B, 1004C, and 1004N, herein generically referred to as the CPU 1002. In some embodiments, the computer system 1000 may contain multiple processors typical of a relatively large system; however, in other embodiments the computer system 1000 may alternatively be a single CPU system. Each CPU 1002 may execute instructions stored in the memory subsystem 1008 on a CPU core 1004 and may comprise one or more levels of on-board cache.

In some embodiments, the memory subsystem 1008 may comprise a random-access semiconductor memory, storage device, or storage medium (either volatile or non-volatile) for storing data and programs. In some embodiments, the memory subsystem 1008 may represent the entire virtual memory of the computer system 1000 and may also include the virtual memory of other computer systems coupled to the computer system 1000 or connected via a network. The memory subsystem 1008 may be conceptually a single monolithic entity, but, in some embodiments, the memory subsystem 1008 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 1008 may contain elements for control and flow of memory used by the CPU 1002. This may include a memory controller 1010.

Although the memory bus 1006 is shown in FIG. 10 as a single bus structure providing a direct communication path among the CPU 1002, the memory subsystem 1008, and the I/O bus interface 1012, the memory bus 1006 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1012 and the I/O bus 1014 are shown as single respective units, the computer system 1000 may, in some embodiments, contain multiple I/O bus interface units 1012, multiple I/O buses 1014, or both. Further, while multiple I/O interface units are shown, which separate the I/O bus 1014 from various communications paths running to the various I/O devices, in other embodiments some or all of the I/O devices may be connected directly to one or more system I/O buses.

In some embodiments, the computer system 1000 may be a multi-user mainframe computer system, a single-user system, or a server computer or similar device that has little or no direct user interface but receives requests from other computer systems (clients). Further, in some embodiments, the computer system 1000 may be implemented as a desktop computer, portable computer, laptop or notebook computer, tablet computer, pocket computer, telephone, smart phone, mobile device, or any other appropriate type of electronic device.

It is noted that FIG. 10 is intended to depict the representative major components of an exemplary computer system 1000. In some embodiments, however, individual components may have greater or lesser complexity than as represented in FIG. 10, components other than or in addition to those shown in FIG. 10 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for reducing power consumption and memory usage in a system evaluating a performance of a machine learning model and preventing a set of inputs from overloading a storage capacity in the machine learning model, the method comprising, in real-time:

receiving, in an artificial intelligence predictive system, the set of inputs for storage in a table in a relational database management system associated with the machine learning model, each input of the set of inputs comprising, respectively, a feature vector comprising a number of values of a set of features;

creating, based on the values of the features, pairwise correlations of the feature vector in each input in the set of features;

limiting the set of inputs by establishing a number of groups of correlated features of the set of features based on the pairwise correlations while prioritizing disjoint groups by applying an algorithm code snippet acting on columns in a correlation table, wherein the number of groups of correlated features is based upon the storage capacity and does not exceed a number of columns available in the table;

concatenating vector predictions to columns in the correlation table and assigning correlations between the values of each feature of the groups of features and a set of prediction values of the machine learning model encoding vector predictions and forming prediction correlations;

selecting from each group a representative feature based on the prediction correlations that represents all of the features of the set of inputs for the each group; and reducing memory usage and preventing overloading the storage capacity in the machine learning model while evaluating a sensitivity of the machine learning model by, instead of storing all of the set of inputs, storing only the representative feature for each group in the table with a prediction from the machine learning model associated with the representative feature.

2. The method of claim 1, wherein:

the table is a structured query language table comprising 21 columns; and the set of inputs comprises thousands of rows of data.

3. The method of claim 1, further comprising:

selecting an additional representative feature from a group when the number of groups is less than the number of columns available in the table;

arranging the set of features in accordance with a predefined order;

iteratively processing each feature of the set of features according to the predefined order, wherein, for each feature, the processing includes determining whether each feature is part of any group of the one or more groups; and using saved memory for updating the machine learning model.

4. The method of claim 3, wherein the processing includes:

determining that a feature in the set of features is not part of any group of the one or more groups;

in response to determining that the feature is not part of any group, searching one or more features having an order higher than the order of the feature and having a correlation that is with the feature and that is higher than a predefined threshold; and forming a group from the one or more features.

5. The method of claim 1, further comprising:

the number of columns available in the table being selected to be a number less than a number of unused columns in the table; and selecting a most correlated feature as the representative feature of all of the features of the set of inputs for the each group.

6. The method of claim 1, further comprising:

receiving a new input;

processing, via the machine learning model, the new input, the processing resulting in a new prediction;

selecting, using a python function, representative features of the new input; and the machine learning model deriving, using a python code, the prediction from the representative features.

7. The method of claim 6, wherein:

selected representative features of the new input are stored in a database having a maximum storage size; and the method further comprises determining that a number of a set of features of the new input is greater than the maximum storage size.

8. The method of claim 6, further comprising using the representative features for each group in a database with the prediction from the machine learning model associated with the representative features for updating the machine learning model.

9. The method of claim 7, wherein the storing of the selected representative features of the new input is performed in response to the determining that the number of the set of features of the new input is greater than the maximum storage size.

10. A system, wherein the system is configured to reduce a power consumption and a memory usage in a processor that evaluates a performance of a machine learning model and prevent an overload of a storage capacity in the machine learning model by a set of inputs and comprises:

a computer memory that comprises a structured query language; and the processor coupled to the computer memory, the processor configured to, in real-time:

execute instructions configured to:

monitor and validate performance of and overcome inputs that exceed a storage capacity of a machine learning model;

reduce power consumption of the processor; and reduce memory consumption in the processor;

receive a set of inputs for storage in a table in a relational database management system associated with the machine learning model;

generate, using a trained machine learning model, a set of prediction values from the set of inputs, wherein each input of the set of inputs comprises, respectively, a feature vector that comprises a number of values of a set of features;

create, based on the values of the features, pairwise correlations of the feature vector for each input of the set of features;

limit the set of inputs based upon a number of groups of correlated features of the set of features based on the pairwise correlations that prioritize disjoint groups based upon an αpplication of an algorithm snipped configured to act upon columns in a correlation table, wherein the number of groups of correlated features is based upon the storage capacity and does not exceed a number of columns available in the storage capacity;

concatenate vector predictions to columns in the correlation table and assign correlations between the values of each feature of the groups of features and the set of prediction values of the machine learning model that encode the vector predictions and form prediction correlations;

select from each group a representative feature based on the prediction correlations that represents all of the features of the set of inputs for the each group;

reduce memory usage and prevent an overload of the storage capacity in the machine learning model; and store, in an evaluation of a sensitivity of the machine learning model, only the representative feature for each group in a database with a prediction from the machine learning model associated with the representative feature in the table.

11. The system of claim 10, wherein:

the system is an artificial intelligence predictive system;

the storage capacity comprises a structured query language table comprising 21 columns; and the set of inputs comprises thousands of rows of data.

12. The system of claim 10, wherein the processor is further configured to:

select an additional representative feature from a group when the number of groups is less than the number of columns available in a table;

arrange the set of features in accordance with a predefined order;

iteratively process each feature of the set of features according to the predefined order, wherein, for each feature, the processing includes determining whether each feature is part of any group of the one or more groups; and provide saved memory to an update of the machine learning model.

13. The system of claim 12, wherein the processor is further configured to:

determine that a feature of the set of features is not part of any group of the one or more groups;

in response to determining that the feature is not part of any group, searching one or more features having an order higher than the order of the feature and having a correlation that is with the feature and that is higher than a predefined threshold; and form a group from the one or more features.

14. The system of claim 10, wherein the processor is further configured to:

receive a new input;

process, via the machine learning model, the new input, and form a new prediction;

select representative features of the new input; and store selected representative features of the new input in association with the new prediction.

15. The system of claim 14, wherein:

the representative features of the new input are stored in a database having a maximum storage size;

the processor is further configured to determine that a number of a set of features of the new input is greater than the maximum storage size; and selection and storage of the representative features of the new input are responsive to a determination that the number of the set of features of the new input is greater than the maximum storage size.

16. A computer program product, wherein the computer program product comprises a computer readable storage medium that comprises program instructions embodied therewith, wherein the program instructions are configured to execute, by a computer, that cause the computer to, in real-time:

monitor and validate performance of and overcome inputs that exceed a storage capacity of a machine learning model in the computer program product;

reduce a power consumption of the computer;

reduce a memory consumption in the computer;

receive a set of inputs for storage in a table in a relational database management system in associated with the machine learning model;

generate, in the machine learning model, a set of prediction values from the set of inputs, wherein each input of the set of inputs comprises, respectively, a feature vector that comprises a number of values of a set of features;

create, based on the values of the features, pairwise correlations of the feature vector for each input of the set of features;

limit the set of inputs based upon a number of groups of correlated features of the set of features based on the pairwise correlations that prioritize disjoint groups based upon an application of an algorithm snipped configured to act upon columns in a correlation table, wherein the number of groups of correlated features is based upon the storage capacity and does not exceed a number of columns available in the storage capacity;

concatenate vector predictions to columns in the correlation table and assign correlations between the values of each feature of the groups of features and the set of prediction values of the machine learning model that encode the vector predictions and form prediction correlations;

select from each group a representative feature based on the prediction correlations that represents all of the features of the set of inputs for the each group;

reduce the memory consumption and prevent an overload of the storage capacity in the machine learning model; and store, in an evaluation of a performance of the machine learning model, only the representative feature for each group in a database with the machine learning prediction associated with the representative feature in the table.

17. The computer program product of claim 16, wherein:

the computer program product is further configured to serve an artificial intelligence predictive system; and the number of groups are disjoint groups.

18. The computer program product of claim 16, further configured to execute:

arranging the set of features in accordance with a predefined order; iteratively processing each feature of the set of features according to the predefined order, wherein, for each feature, the processing includes determining whether each feature is part of any group of the number of groups; and provide saved memory to an update of the machine learning model.

19. The computer program product of claim 18, wherein the program instructions are further configured to:

determine that a feature of the set of features is not part of any group of the number of groups;

in response to a determination that the feature is not part of any group, searching one or more features having an order higher than the order of the feature and having a correlation that is with the feature and that is higher than a predefined threshold; and form a group from the one or more features.

20. The computer program product of claim 16, wherein the program instructions are further configured to cause the computer to select a most correlated feature as the representative feature of all of the features of the set of inputs for the each group.

* * * * *